United States Patent [19]

Kobayashi et al.

[11] Patent Number: 5,095,072
[45] Date of Patent: Mar. 10, 1992

[54] THERMOPLASTIC ELASTOMER COMPOSITION

[75] Inventors: Toshiaki Kobayashi; Naoyuki Kobayashi, both of Kawasaki, Japan

[73] Assignee: Nippon Zeon Co., Ltd., Tokyo, Japan

[21] Appl. No.: 684,494

[22] Filed: Apr. 15, 1991

Related U.S. Application Data

[63] Continuation of Ser. No. 284,576, Dec. 14, 1988, abandoned.

[30] Foreign Application Priority Data

Dec. 17, 1987 [JP] Japan ................................ 62-319743
Dec. 17, 1987 [JP] Japan ................................ 62-319744

[51] Int. Cl.$^5$ ........................... C08L 27/16; C08L 9/02; C08L 33/08
[52] U.S. Cl. ........................... 525/199; 525/233
[58] Field of Search ........................... 525/199, 233

[56] References Cited

U.S. PATENT DOCUMENTS

| 3,804,925 | 4/1974 | Kato | 525/306 |
| 4,129,608 | 12/1978 | Murayama | 525/308 |
| 4,508,875 | 4/1985 | Kishida | 525/308 |
| 4,703,083 | 10/1987 | Giori | 525/86 |
| 4,822,654 | 4/1989 | Takemura | 525/199 |

FOREIGN PATENT DOCUMENTS 0194030 9/1986 European Pat. Off. .

Primary Examiner—John C. Bleutge
Assistant Examiner—David Buttner
Attorney, Agent, or Firm—Armstrong, Nikaido, Marmelstein, Kubovcik & Murray

[57] ABSTRACT

A thermoplastic elastomer composition comprising 90 to 10 wt. % of a nitrile rubber, which contains at least 30 wt. % of a gel component insoluble in methyl ethyl ketone, and to to 90 wt. % of a vinylidene fluoride resin.

8 Claims, No Drawings

THERMOPLASTIC ELASTOMER COMPOSITION

This application is a continuation of application Ser. No. 284,576 filed Dec. 14, 1988 now abandoned.

BACKGROUND OF THE INVENTION

The present invention relates to a thermoplastic elastomer composition. More specifically, the invention relates to a thermoplastic elastomer which can be molded without the need of vulcanization and can exhibit remarkable charateristics with respect to the permanent compression set and oil resistance.

In the field of vulcanized rubbers, increasingly great attention has lately been paid to the so-called thermoplastic elastomers, namely such rubbers which can be molded in a same manner as thermoplastic resins, without the need of vulcanization.

Shortcomings indicated of the known thermoplastic elastomers are that they do not have a satisfactory creap strength, that they cannot compare to vulcanized rubbers with respect to for example the permanent compression set, and also that they are not necessarily satisfactory in respect of the weather resistance.

Then, it is known in the prior art to attain an improvement in or relating to the permanent compression set by adding a gel-containing nitrile rubber to vinyl chloride resins (Japanese patent application Kokai publication No. 61-192754). According to this known method, it is possible to lower the permanent compression set after the lapse of 70 hours at 100° C. to the order of 45%, but it has not yet been possible to attain the same permanent compression set as in the cases of vulcanized rubbers.

Also, with reference to European patent publication No. 194030, this shows a composition comprising a vinylidene fluoride resin and at least one rubber selected from acrylic rubbers, $\alpha,\beta$-unsaturated nitrile-conjugated diene copolymer rubbers (and hydrides of the $\alpha,\beta$-unsaturated nitrile-conjugated diene copolymer rubbers), which composition is described to have a heat resistance and a gasoline resistance which are remarkable and have good tensile strength and elongation. However, to process this composition by molding, it is required to operate a vulcanization step such as for example a press curing using a vulcanizing agent, and the composition cannot be processed in same manners as thermoplastic resins.

BRIEF SUMMARY OF THE INVENTION

It is a primary object of the present invention to provide a thermoplastic elastomer composition which can be molded by the same method as for processing thermoplastic resins, without the need of effecting a vulcanization in molding.

It also is an object of the invention to provide a thermoplastic elastomer composition which can provide moldings remarkably advantageous with respect to the permanent compression set.

According to the present invention, the above objects of the invention can be attained by providing a thermoplastic elastomer composition comprising 90 to 10 wt. % of an elastomer selected from the group consisting of nitrile rubbers and acrylate elastomers and containing at least 30 wt. % of a gel component insoluble in methyl ethyl ketone, and 10 to 90 wt. % of vinylidene fluoride resin.

DESCRIPTION OF THE PREFERRED EMBODIMENTS

The thermoplastic elastomer composition according to the present invention comprises 90 to 10 wt. % of a component (A) and 10 to 90 wt. % of a component (B). The component (A) is an elastomer selected from nitrile rubbers and acrylate elastomers, and the component (B) is vinylidene fluoride resin, wherein the elastomer of the component (A) contains 30% or more of a gel component which is insoluble in methyl ethyl ketone.

Nitrile rubbers for the component (A) may be a copolymer of dienic monomers such as butadiene, isoprene and so forth with nitrile monomers such as acrylonitrile, methacrylonitrile, propionitrile and so forth, or a terpolymer of the above dienic monomers and nitrile monomers with a third monomer copolymerizable with the dienic monomers and nitrile monomers.

Useful for the third monomer is any of vinyl aromatic compounds such as alkyl(metha)acrylate, vinyl or allyl ether and chlorostyrene, epoxy group-containing compounds such as allyl glycidyl ether, and carboxyl group-containing compounds such as crotonic acid.

According to the present invention, it is also possible to use for the above nitrile rubber a hydrogenated copolymer obtained by hydrogenating the conjugated diene unit in the above copolymers or terpolymers.

Although no particular limitation is applicable to the acrylonitrile content in the nitrile rubber, from the standpoint of the compatibility with vinylidene fluoride resin, it preferably is 20 to 50 wt. %.

The acrylate elastomer for the component (A) may be any of acrylate homopolymer elastomer, ethylene-acrylate copolymer elastomer, ethylene-vinyl acetate-acrylate copolymer elastomer, acrylate-acrylonitrile copolymer elastomer, acrylate-vinyl acetate-acrylonitrile copolymer elastomer and acrylate-butadiene-acrylonitrile copolymer elastomer, even though the useful acrylate elastomer is not limited to these examples.

Examples of the useful vinylidene fluoride resin for the component (B) include polyvinylidene fluoride and copolymers of vinylidene fluoride with at least one of hexafluoropropylene, pentafluoropropylene, tetrafluoroethylene, trifluoroethylene, vinyl fluoride, perfluoro(methyl vinyl ether), perfluoro(propyl vinyl ether), ethylene, propylene, styrene, vinyl acetate, acrylonitrile, and acrylic ester or methacrylic ester. Although no particular limitation is applicable to the average molecular weight of the vinylidene fluoride resin, it preferably is $10^3$ to $10^6$.

For purposes of the present invention, further, the elastomer for the component (A) contains 30 wt. % or more of a gel component insoluble in methyl ethyl ketone as stated above, and the content of the gel component is more preferably at least 50 wt. %.

A gel-containing elastomer for the component (A) may be obtained by the method in which a crosslinking monomer having a plurality of double bonds in the molecule such as divinyl benzene, diallyl phthalate, diallyl maleate and trimethylol propane triacrylate, is copolymerized with an elastomer for the component (A) to thereby cause intermolecular crosslinking to become formed. Alternatively, a component (A) elastomer having a high content of the gel component can be obtained without the use of a crosslinking monomer, by operating a polymerization at a high temperature of for example 40° to 70° C.

Where the content of the gel component does not reach 30 wt. %, it is infeasible to obtain a composition of which a sufficient improvement is made in or relating to the permanent compression set as desired according to the present invention.

Further, no particular upper limit is applicable to the content of the gel component, but to take the processability of the composition into consideration, the gel content should preferably be up to 98%.

The amount of the gel component in the component (A) elastomer can be determined as follows: To 100 ml of methyl ethyl ketone, 1 g of the component (A) elastomer subjected to a mastication for 10 minutes by water-cooled rolls may be added and dissolved over a day and a night at room temperature, and to the resulting solution placed in a Soxhlet extractor, 200 ml of methyl ethyl ketone may be added to effect an extraction for 18 hours. The filter paper used for the extraction may then be dried, and the amount of the filter residue on the filter paper may be determined.

The compounding ratio of the component (A) to the component (B) according to the present invention is within a range of 90/10 to 10/90 or, more preferably, 85/15 to 15/85, in the weight ratio.

If the compounding ratio exceeds 90/10, physical properties of the resulting composition are lowered at a considerable extent, and if it does not reach 10/90, the resulting composition tends to be so hard that the degree of the permanent compression set tends to become higher.

Compounding of the component (A) and the component (B) together may be made by charging both components (A) and (B) in a kneading apparatus normally used in kneading rubbers or resins such as for example a Brabender mixer, a Banbury mixer, a kneader, a mixing roll, an extruder and so forth, and operating a kneading at a temperature of 150° to 250° C. Particles of the component (A) containing a gel component, which are dispersed in the component (B), have a particle size of 0.01 to 2 μm or, more preferably, 0.01 to 1 μm.

The thermoplastic elastomer composition according to the invention may contain, as needs be, any of various additives such as a stabilizer, a lubricant, a filler, an antioxidant, an ultraviolet ray abosorber, a plasticizer, a processing aid, a foaming agent, a pigment, a fire retardant and so forth. It may also contain a copolymer such as fluororubber for example, which is different from the before enumerated copolymers and terpolymers.

By molding the thermoplastic elastomer composition according to the invention by any of methods ordinarily employed in the processing of thermoplastic resins such as an extrusion molding, compression molding, calendering, blow molding, injection molding and so forth, it is feasible to obtain moldates remarkably desirable with respect to the permanent compression set.

By making use of their characteristic relating to the permanent compression set, which is remarkably limited, the moldates made of the elastomer composition of the present invention can be suitably used in the form of oil resistant hose, gaskets, packings and so forth.

In molding the composition according to the invention, it is unnecessary to operate a vulcanization, so that it can be advatageously made to recycle any residue or excess portion of the composition after molding or any failure moldate to the starting material for the molding.

Now, the present invention will be described in further detail in connection with Examples and Comparative Examples, in which parts and percent (%) values are based on weight unless otherwise specified.

EXAMPLE 1 AND COMPARATIVE EXAMPLE 1

Various nitrile rubbers and vinylidene fluoride resins as shown in the below Table 1 were kneaded in various combinations of use amounts as shown also in the Table 1 below by hot rolls maintained at 175° C. for 10 minutes to prepare a variety of sheets. Each of the sheets was subjected to a hot pressing at 180° C. for 10 minutes to prepare a tesing sample for finding the rate of the permanent compression set, having the prescribed dimensional specification. The rate of permanent compression set was determined according to JIS K-6301, and results of the determinations are shown by rates (%) of the permanent compression set found after the lapse of 70 at 100° C. under a 25% compression. The results of determinations are also shown in the Table 1 below, which also enters results of the rating with respect to the oil resistance, made according to JIS K-6301 and using fuel oil B, the results being shown by the rates of the volume change after the lapse of 70 hours at 40° C.

TABLE 1

|  | Run No. | Nitrile Rubber | | Vinylidene Fluoride Resin[1] (part) | Rate of Permanent Compression Set (%) | Oil Resistance (Rate of Volume Change) (%) |
|  |  | Content of Acrylo-nitrile (%) | Gel Component Insoluble in Methyl Ethyl Ketone (%) | Amount Added (part) |  |  |  |
|---|---|---|---|---|---|---|---|
| Ex. 1 | 1 | 33 | 70 | 60 | 40 | 37 | +8 |
|  | 2 | 38 | 80 | 60 | 40 | 35 | +6 |
|  | 3 | 45 | 90 | 60 | 40 | 34 | +4 |
|  | 4 | 25 | 85 | 60 | 40 | 33 | +9 |
|  | 5 | 38 | 50 | 60 | 40 | 38 | +9 |
|  | 6 | 38 | 80 | 80 | 20 | 32 | +8 |
|  | 7 | 38 | 80 | 30 | 70 | 40 | +2 |
|  | 8 | 38 | 80 | 60 | 40[2] | 37 | +7 |
| Comp. Ex. 1 | 9 | 38 | 5 | 60 | 40 | 65 | +10 |
|  | 10 | 38 | 80 | 5 | 95 | 85 | +1 |
|  | 11 | 38 | 80 | 95 | 5 | 75 | +20 |

[1] Solef 1010 (vinylidene fluoride homopolymer, a product of Solvay)
[2] Solef 11010 (vinylidene fluoride-hexafluoropropylene copolymer, a product of Solvay)

EXAMPLE 2 AND COMPARATIVE EXAMPLE 2

Various acrylate elastomers and vinylidene fluoride resins as shown in Table 2 below were kneaded in various combinations of use amounts as shown also in the below Table 2 by hot rolls maintained at 175° C. for 10 minutes to prepare a variety of sheets. Each of the sheets was subjected to a hot pressing at 180° C. for 10 minutes to prepare a tesing sample for finding the permanent compression set, having the prescribed dimensional specification. The rate of permanent compression set was determined according to JIS K-6301, and results of the determinations are shown by the rates (%) of permanent compression set found after the lapse of 70 hours at 100° C. under a 25% compression. The results of determinations are also shown in the below Table 2.

Further, using a Sunshine type weatherometer, a rating of the weather resistance was operated of the testing samples after the lapse of 500 hours to find that all tested samples did not undergo either a change in color or a cracking. However, according to the present invention, it was possible to attain a remarkable improvement in or relating to the permanent compression set without adversely affecting the weather resistance.

3. The composition according to claim 1, wherein the content of said gel component is at least 50 wt. %.

4. The composition according to claim 1, comprising 85 to 15 wt. % nitrile rubber and 15 to 85 wt. % vinylidene fluoride resin.

5. The composition according to claim 1, wherein said nitrile rubber is a rubber selected from the group consisting of copolymers of dienic monomers with nitrile monomers, and terpolymers of dienic monomers and nitrile monomers with a third monomer copolymerizable with those dienic monomers and nitrile monomers.

6. The composition according to claim 5, wherein said third monomer is a monomer selected from the group consisting of vinyl aromatic compounds, epoxy group-containing compounds and carboxyl group-con-

TABLE 2

| Run No. | | Acrylate Elastomer | | Added Amount of Vinylidene Fluoride Resin[5] (part) | Rate of Permanent Compression Set (%) |
|---|---|---|---|---|---|
| | | Composition | Gel Component Insoluble in Methyl Ethyl Ketone[1] (%) | Amount Added (part) | | |
| Ex. 2 | 12 | butyl acrylate homopolymer[2] | 90 | 50 | 50 | 42 |
| | 13 | butyl acrylate-methyl methacrylate copolymer[3] | 70 | 50 | 50 | 42 |
| | 14 | butyl acrylate-acrylonitrile copolymer[4] | 85 | 50 | 50 | 41 |
| | 15 | same as in Run No. 14 | 50 | 50 | 50 | 43 |
| | 16 | same as in Run No. 14 | 85 | 50 | 50 | 39 |
| | 17 | same as in Run No. 14 | 85 | 30 | 70 | 44 |
| | 18 | same as in Run No. 14 | 85 | 70 | 30 | 37 |
| | 19 | same as in Run No. 14 | 85 | 50 | 50[6] | 39 |
| Comp. Ex. 2 | 20 | same as in Run No. 14 | 85 | 5 | 95 | 85 |
| | 21 | same as in Run No. 14 | 85 | 95 | 5 | 75 |
| | 22 | same as in Run No. 14 | 5 | 50 | 50 | 65 |

[1]In the preparation of the acrylate elastomers, triallyl trimellitate was added and by adjusting the amount thereof, the content of the gel component was adjusted.
[2]Butyl acrylate homopolymer, except that triallyl trimellitate was used as gel-component adjusting agent.
[3]Copolymer of 80:20 of butyl acrylate:methyl methacrylate in weight ratio
[4]Copolymer of 75:25 of butyl acrylate:acrylonitrile in weight ratio
[5]Solef 1010 (vinylidene homopolymer, a product of Solvay)
[6]Solef 11010 (vinylidene fluoride-hexafluoropropylene copolymer, a product of Solvay)

What is claimed is:

1. A thermoplastic elastomer composition comprising 90 to 10 wt. % of a nitrile rubber containing at least 30 wt. % of a gel component which is insoluble in methyl ethyl ketone, and 10 to 90 wt. % of vinylidene fluoride resin, said gel component being formed through copolymerization of a cross-linking monomer having a plurality of double bonds in its molecule with said nitrile rubber.

2. The composition according to claim 1, wherein said nitrile rubber is dispersed in the form of particles containing said gel component in said vinylidene fluoride resin.

taining compounds.

7. The composition according to claim 1, wherein said cross-linking monomer is selected from the group consisting of divinyl benzene, diallyl phthalate, diallyl maleate and trimethylol propane triacrylate.

8. The composition according to claim 1, wherein said vinylidene fluoride resin is polyvinylidene fluoride and copolymers of vinylidene fluoride with at least one compound selected from the group consisting of hexafluoropropylene, pentafluoropropylene, tetrafluoroethylene, trifluoroethylene, cvinyl fluoride, perfluoro(methyl vinyl ether), perfluoro(propyl vinyl ether), ethylene, propylene, styrene, vinyl acetate, acrylonitrile, acrylic ester and methacrylic ester.

* * * * *